(No Model.)

S. J. ARNOLD.
MACHINE FOR CROZING AND DRESSING BARRELS.

No. 251,156. Patented Dec. 20, 1881.

Witnesses,  
John Howes  
S. R. Paxton

Inventor.  
Saxton J. Arnold  
By Chas. H. Burleigh  
Atty.

UNITED STATES PATENT OFFICE.

SAXTON J. ARNOLD, OF HUBBARDSTON, MASSACHUSETTS.

MACHINE FOR CROZING AND DRESSING BARRELS.

SPECIFICATION forming part of Letters Patent No. 251,156, dated December 20, 1881.

Application filed October 8, 1881. (No model.)

*To all whom it may concern:*

Be it known that I, SAXTON J. ARNOLD, of Hubbardston, in the county of Worcester and State of Massachusetts, have invented certain new and useful Improvements in Machines for Making Barrels; and I declare the following to be a description of my said invention sufficiently full, clear, and exact to enable others skilled in the art to which it appertains to make and use the same, reference being had to the accompanying drawings, which form a part of this specification.

The objects of my present invention are, first, to provide convenient and efficient mechanism for trimming off and finishing the ends of barrels, casks, kegs, &c., in a neat, uniform, and expeditious manner, preparatory to their receiving their heads; second, to provide means for surfacing or smoothing the exterior of the staves; and, third, to afford facilities for the convenient introduction and removal of the barrels to and from the machine. These objects I attain by mechanism substantially such as hereinafter described, the particular features claimed being definitely specified.

Figure 1:
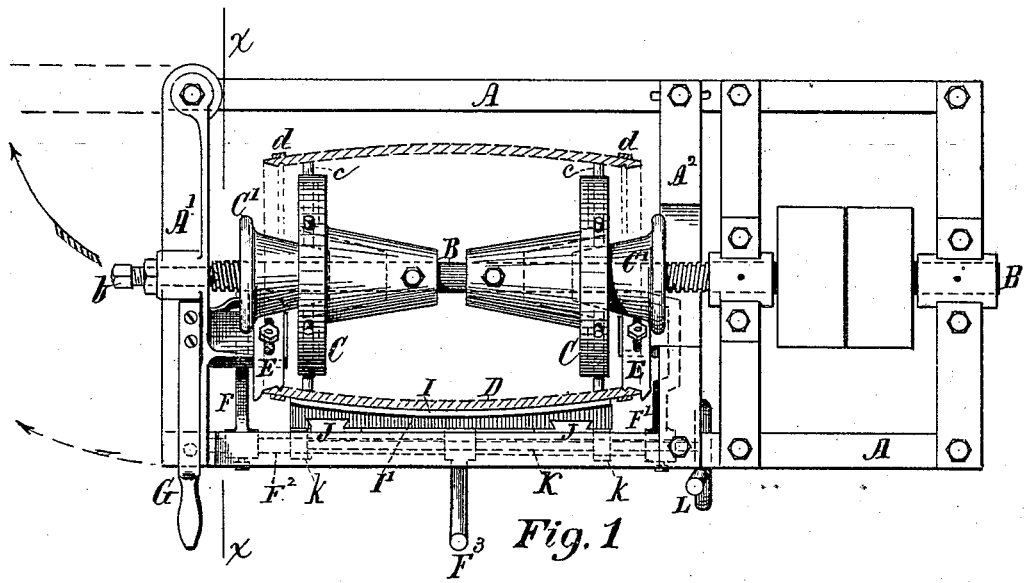
Figures 2, 3, 4:
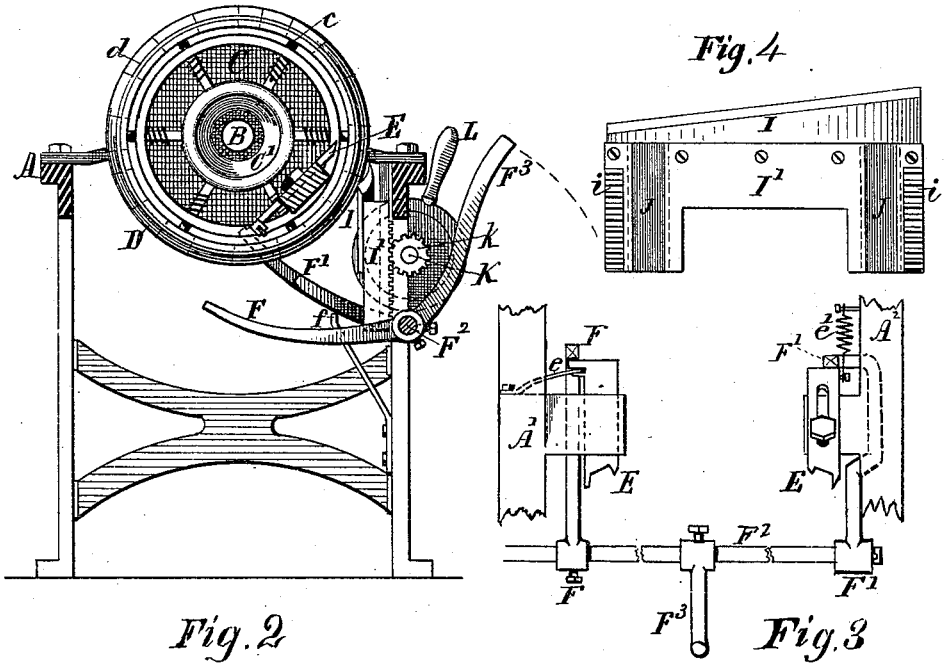

In the drawings, Figure 1 is a plan view of mechanism embodying my improvements. Fig. 2 is a transverse section of the same at line $x\ x$. Fig. 3 is a view of the cutters and actuating-levers separate from the machine, and Fig. 4 is a view of the surfacing-cutter and its carrier separate from the machine.

In reference to the drawings, A denotes the frame for supporting the revolving shaft or spindle B, which is provided with a pulley for the driving-belt, and upon which are mounted the barrel holding chucks C, that are adapted for independently centering and supporting the respective ends of the barrel D in such manner that they will revolve truly and concentrically with said shaft B. The chucks C are constructed and arranged substantially as described in my Letters Patent No. 81,575, and consist of a series of properly-guided studs, $c$, which are forced outward against the inner surface of the staves by means of conical nuts C' working on screw-threads on the shaft B, as indicated.

E E indicate cutters or chisels, supported on the frame by suitable arms or brackets, and arranged at a proper cutting-angle within the circle of the barrel ends, to be moved by reciprocative action into contact with the inner surface of the staves, (as the barrel revolves about the axis of the shaft B,) where they act upon the substance of the barrel, in the manner of turning-tools, for turning out the diameter to proper size, trimming off the staves to proper length, cutting the groove for the head, and cutting the chamfer of the chines at a single operation, the cutters being made with their cutting-edges properly molded or formed to impart the required shape. These cutters may be formed in a single piece, or may be composed of several sections or pieces secured together, as preferred.

The reciprocative movement for bringing the cutters E up to the work may be imparted by means of screws, racks, or otherwise. In the present instance their movement is effected by means of arms F F', connected with a rock-shaft, $F^2$, which is operated by the hand-lever $F^3$, the parts being arranged as indicated; and the cutters are drawn back from their work by means of suitably-arranged springs $e\ e'$; or weights could be used, if preferred.

The end piece, A', of the frame A is pivoted to swing outward, in the manner indicated in Fig. 1 by dotted lines, thus opening the end of the machine to permit of the barrel D being passed onto and off from the shaft B and chucks C. Said end piece is provided with a pointed center or stud, $b$, for supporting the end of the shaft B, and with a spring-latch, G, or equivalent device, for locking and releasing its forward end to and from the stationary portion of the frame.

The arm F', which is offset to clear the end of the barrel, is connected with the shaft $F^2$ in a manner to have a limited extent of movement thereon, and is supported at its lowest position by a bracket, $f$, while the arm F drops to a lower position, as indicated in Fig. 2, so as not to interfere with the removal of the barrel from the machine. When raised, however, the arms act to move both the cutters in unison, so that both perform their work at the same time.

I indicates a surfacing-cutter for smoothing off the exterior of the barrel-staves between the end hoops. Said cutter is in the present instance formed to the desired curve of the bilge, and is attached to a vertically-moving carrier or frame, I', arranged on dovetailed guides J, fixed on the frame A, and operated up and down by racks $i$ and pinions $k$, the latter being fixed on a shaft, K, that is operated by the wheel or handle L, depression of which causes the cutter I to move upward past the bilge of the cask and shave off all wood projecting beyond the line of the cutter.

In lieu of making the cutter I the entire length of the barrel, it may be made in a short section and mounted so as to have a longitudinal or traverse movement along a curved guide parallel with the surface of the staves, so that while the cutter occupied but a narrow space the entire surface could be smoothed by moving the cutter from end to end while it was raised in contact with the staves.

The operation is as follows: The end piece, A', being swung back and the nuts C' run out to a proper degree, the barrel D, set up with a retaining-hoop, $d$, at each end, is passed over the chucks C to the required position. The end A' is then closed and latched, and the nuts C' are run up until the studs $c$ of the chucks take a firm bearing on the interior of the staves. This centers the two ends in relation to the shaft B, each end independent of the other, and also secures the barrel, so that it will revolve therewith. The belt is then thrown on to revolve the shaft and barrel with a rapid motion. The operator then presses down the handle $F^3$, causing the cutters F to advance and turn out the ends in proper manner, as before described. He then, by the handle L, causes the advancement of the cutter I for surfacing the exterior of the staves. The barrel is then ready to be taken from the machine and to receive its heads.

By means of this mechanism the ends of the barrels are all formed of a uniform size, shape, and diameter, so that heads turned to uniform size will accurately fit in either end of any barrel, while the work can be performed in a neat and thorough manner, and a superior quality of barrels can be made at little expense and by persons having but little skill.

It will be understood that suitable stops or guides would be employed for indicating the proper extent of movement for the cutters when operating the machine; also, that the support-bar $A^2$ and cutter mechanism could be made adjustable in direction of the length of shaft B, so as to adapt the machine for working different sizes of barrels and casks, different sizes and forms of blades being used to give different-shaped grooves and chamfers on the chines.

What I claim as of my invention, and desire to secure by Letter Patent, is—

1. In a machine for making barrels, the combination of a revolvable shaft provided with chuck mechanism for centering and supporting the respective ends of a barrel or cask, the reciprocating chisels, respectively mounted upon stationary inclined supports within the circle of the chines, and having cutting-edges molded or adapted for the squaring-off, chamfering, and crozing cuts, and an actuating mechanism that simultaneously advances said chisels to the work, whereby the ends of barrels are uniformly turned off and finished at a single operation, substantially as hereinbefore set forth.

2. The combination of the shaft B, the expansible chucks C, the reciprocating cutters E, mounted for action, as described, and the actuating levers or arms F F', rock-shaft $F^2$, and hand-lever $F^3$, substantially as and for the purposes set forth.

3. The combination, with the frame A, shaft B, and barrel-supporting chucks or devices C, of the swinging end piece, A', having a center or stud, $b$, and a locking device, G, substantially as and for the purposes set forth.

4. The combination, with the shaft B, provided with the expansible holding-chucks C, adapted for centering and revolving a barrel, of a surfacing-cutter, I, adapted for smoothing off the exterior of the barrel at the bilge, mounted for reciprocative action on guideways fixed to the frame A, and an actuating mechanism for moving said cutter in contact with the exterior of the barrel, substantially as hereinbefore described.

5. The combination, with the frame A, shaft B, and chucks C, of the blade I, carrier I', guides J, pinion-shaft K, and handle L, substantially as and for the purposes described.

Witness my hand this 28th day of September, A. D. 1881.

S. J. ARNOLD.

Witnesses:
 WILLIAM H. WHEELER,
 WM. C. MAREAU.